United States Patent [19]
Burgess

[11] Patent Number: 5,642,892
[45] Date of Patent: Jul. 1, 1997

[54] GLAND SEAL ASSEMBLY HOUSING

[75] Inventor: Kevin Edward Burgess, Carlingford, Australia

[73] Assignee: Warman International Limited, Artarmon, Australia

[21] Appl. No.: 525,704
[22] PCT Filed: Mar. 10, 1994
[86] PCT No.: PCT/AU94/00114
§ 371 Date: Sep. 12, 1995
§ 102(e) Date: Sep. 12, 1995
[87] PCT Pub. No.: WO94/20757
PCT Pub. Date: Sep. 15, 1994

[30] Foreign Application Priority Data

Mar. 12, 1993 [AU] Australia ............... PL7758/93

[51] Int. Cl.⁶ ............................................. F16J 15/16
[52] U.S. Cl. .............. 277/105; 277/63; 277/64; 277/70; 277/167.5
[58] Field of Search ............... 277/5, 6, 12, 50, 277/60, 63, 64, 66, 101, 102, 104, 105, 119, 123, 167.5, 194, 110, 115

[56] References Cited

U.S. PATENT DOCUMENTS

| 691,813 | 1/1902 | Saxton | 277/60 |
| 1,834,190 | 12/1931 | Timbs | 277/105 |
| 1,947,257 | 2/1934 | Fritz et al. | 277/123 |
| 2,049,774 | 8/1936 | Hoffman | 277/66 |
| 2,322,679 | 6/1943 | Williamson | 277/64 |
| 2,386,898 | 10/1945 | Karassik | 277/64 |
| 4,623,152 | 11/1986 | St Jean | 277/105 |
| 4,965,409 | 10/1990 | Lindroos | 277/123 |

FOREIGN PATENT DOCUMENTS

| 84 444/82 | 1/1983 | Australia . |
| 748 903 | 7/1933 | France . |
| 346 038 | 12/1921 | Germany . |
| 853 995 | 12/1952 | Germany . |
| 857 741 | 12/1952 | Germany . |
| 2 034 586 | 1/1972 | Germany . |
| 79688 | 8/1986 | Taiwan . |
| 179927 | 3/1992 | Taiwan . |
| 288940 | 4/1928 | United Kingdom . |
| 790817 | 2/1958 | United Kingdom . |

*Primary Examiner*—Daniel G. DePumpo
*Attorney, Agent, or Firm*—Darby & Darby

[57] ABSTRACT

A housing for a gland seal assembly, the housing comprising a main body having a bore therethrough for receiving a rotatable shaft. The main body includes first and second parts each having a packing receiving zone within the bore, each of said first and second parts including an abutment wall which forms and end wall of the packing receiving zone, and adjustment means which is operable to cause relative movement between the abutment walls in the axial direction of the bore.

7 Claims, 4 Drawing Sheets

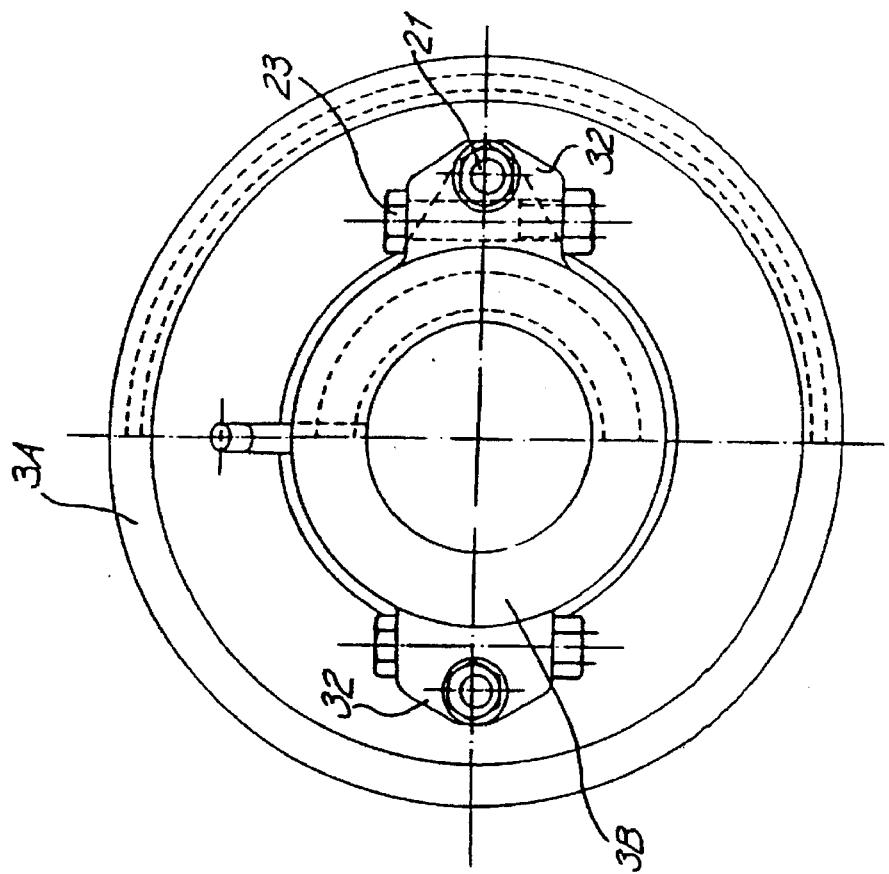
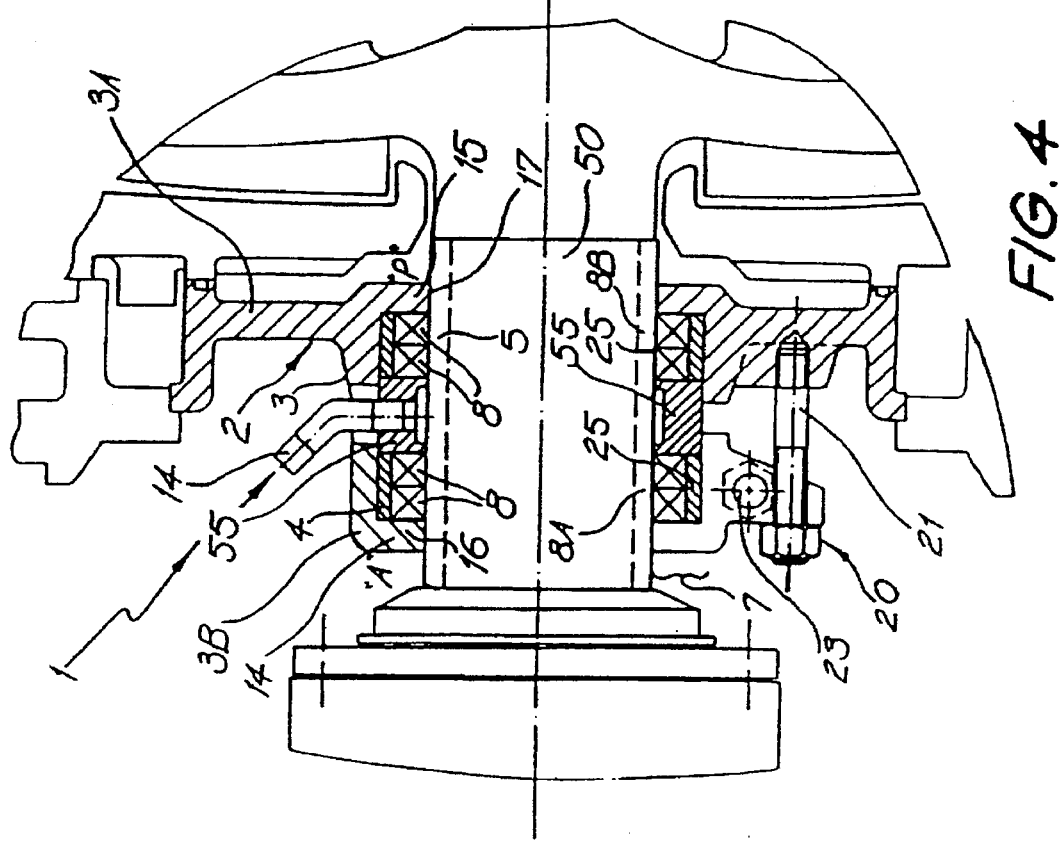

GLAND SEAL ASSEMBLY HOUSING

BACKGROUND OF THE INVENTION

1. Field of the invention

This invention relates generally to a seal assembly for pumps and were particularly, though not exclusively to centrifugal slurry pumps.

2. Discussion of the Related Art

Gland seal assemblies have been used on centrifugal water and slurry pumps for many years. Typical conventional gland assemblies are shown in FIGS. 1, 2 and 3 FIGS. 1, 2 and 3 are partial schematic sectional elevations of conventional gland seal assemblies. Such assemblies generally consist of an outer housing 2 which is normally called the stuffing box, with a cylindrical bore 4, through which passes a rotatable shaft 50 which may for example be, a pump shaft. An end wall 35 is disposed at one end of the bore. Shaft 50 may or may not have a protective sleeve thereon. The annular gap between the bore 4 and the shaft 50 is typically filled with packing 5 which may be in the form of a number of packing rings 8. The packing material can vary depending upon the application but is normally woven from fibres in a square or rectangular section which can be cut into annular rings. Materials are chosen for strength and other lubricants (such as PTFE) may be added to reduce friction.

Packing 5 is normally placed into the housing or stuffing box and compressed from the outside end by a gland 9. Due to the compressibility of the packing 5 this allows the gap between the packing 5 and shaft (or its sleeve) 50 to be adjusted by moving the gland 9 into and out of the annular gap forming a packing space. External bolts (not shown) normally permit this adjustment to be effected. Adjusting the gap between the stationary packing 5 and the rotating shaft 50 allows the leakage from the assembly to be regulated. This leakage may in certain applications be critical to ensure proper cooling of the packing and shaft and to remove the heat generated by friction.

Sealing assemblies of this type for water pumps can utilize the pumped liquid that leaks from the sealing assembly during operation to help cool the assembly. Adequately lubricated assemblies are necessary for a long life.

Slurry pumps offer an additional problem because the slurry being pumped contains particles. These particles cause additional friction and wear to the packing and sleeve. For slurry pumps it is common practice to inject clean sealing water from an external supply into the assembly to reduce these problems and ensure a long life. The water is injected into the assembly via a feed channel 14 to a lantern ring assembly 10. The lantern ring assembly may comprise a lantern ring 11 and a restrictor 12. In FIG. 1 the restrictor 12 is formed of metal and in FIG. 2 it is a non-metallic device. In FIG. 3 there is a lantern ring 11 which is spaced from a neck ring 15 by a packing 8D. The lantern ring and lantern restrictors direct the water introduced via channel 14 into a gap around the shaft or sleeve thereon. This allows water into the critical gap between the packing 5 and the shaft 50 for proper and effective lubrication. Both lantern ring and lantern ring restrictor arrangements allow some sealing water to flow into the pump. This has the desired effect of flushing solids or particles away from the sealing assembly, hence minimising the risk of slurry contamination into the gland.

Such conventional arrangements described above have inherent problems in their design as well as causing operational and maintenance problems for slurry pumps. It is a maintenance requirement that pumps need to be repacked (that is new fresh packings replaced for old worn packings) without the necessity of a major pump strip down. Here the small annulus around the shaft sleeve presents a problem because it is deep and very difficult, if not impossible to look into during repacking. Hence a lot of repacking work is done by feel. Repacking is made more difficult by the lack of access at the back of centrifugal slurry pumps. A further problem is associated with operators who do not always make proper adjustments. Water supply can be variable or even fail leading to wear and failure of the packings and sleeve. Water can also leak around the outside instead of the inside of the diameter of the packings.

SUMMARY OF THE INVENTION

The present invention seeks to alleviate one or more of the aforementioned problems associated with conventional sealing assemblies.

According to the present invention there is provided a housing for a gland seal assembly, the housing comprising a main body having a bore therethrough for receiving a rotatable shaft. The main body includes first and second parts each having a packing receiving zone within the bore. Each of the first and second parts include an abutment wall which forms an end wall of the packing receiving zone. There is a further provided adjustment means which is operable to cause relative movement between the abutment walls in the axial direction of the bore.

The packing receiving zone may comprise the annular region or gap between the inner wall surface of the bore and the outer surface of the rotatable shaft when in the assembled position.

Each abutment wall may comprise a flange extending generally radially inward with respect to the inner wall surface of the bore. Preferably, the abutment flanges are formed on the first and second parts of the housing. When in the assembled position these abutment walls are remote from one another. The bore in each part of the housing may open towards one another and the parts may be slightly spaced apart so as to receive a lantern ring assembly therebetween.

Preferably, each of the abutment flanges has a free inner edge which is disposed adjacent the surface of the shaft when in the assembled position and can function as would a restrictor. In another arrangement, neck rings may be disposed at opposite ends of the packing receiving zone between the abutment wall and the packing. Advantageously, a plurality of packing rings are disposed within each part of the housing.

One part of the housing is preferably secured to the pump casing with the other part being operatively connected thereto so that it can move axially relative to that first mentioned section as a result of operation of the adjustment means.

The adjustment means may be in the form of a plurality of threaded bolts interconnecting the first and second parts of the housing so that rotation thereof causes the axial movement of the two parts. Furthermore, at least one of the parts of the housing comprises two sections interconnected by bolts and arranged so that the two parts can be separated to facilitate ease of access and dismantling of the housing.

The gland seal assembly may include at least two packing rings and a packing sleeve surrounding the packing rings arranged so that axial compression of the packing sleeve can be translated at least in part to radially compression onto the packing rings. The packing sleeve may comprise an elastomeric ring disposed between the packing rings and the inner surface of the bore. The sleeve may be in the form of an annular ring forming an outer rim wall or may additionally include a radially inwardly extending side wall at one end of the rim wall.

Two groups of packing rings may be provided each group having associated therewith one of the aforementioned packing sleeves. The groups of packing rings may be spaced from one another by a lantern ring or the like.

BRIEF DESCRIPTION OF THE DRAWINGS;

In one preferred arrangement the lantern ring comprises a first portion which fits between the two groups of packing rings and a second portion configured so as compress the packing sleeves when in the mounted position. There may further be provided an 0-ring or like element providing a seal between the lantern ring and the housing.

Preferred embodiments of the invention will hereinafter be described with reference to the accompanying drawings and in those drawings:

FIG. 4 is a schematic partial side elevation of a gland seal assembly incorporating a housing according to the present invention;

FIG. 5 is a front elevation of the gland seal assembly shown in FIG. 4;

DETAILED DESCRIPTION OF THE PREFERRED EMBODIMENT

Figure 1:
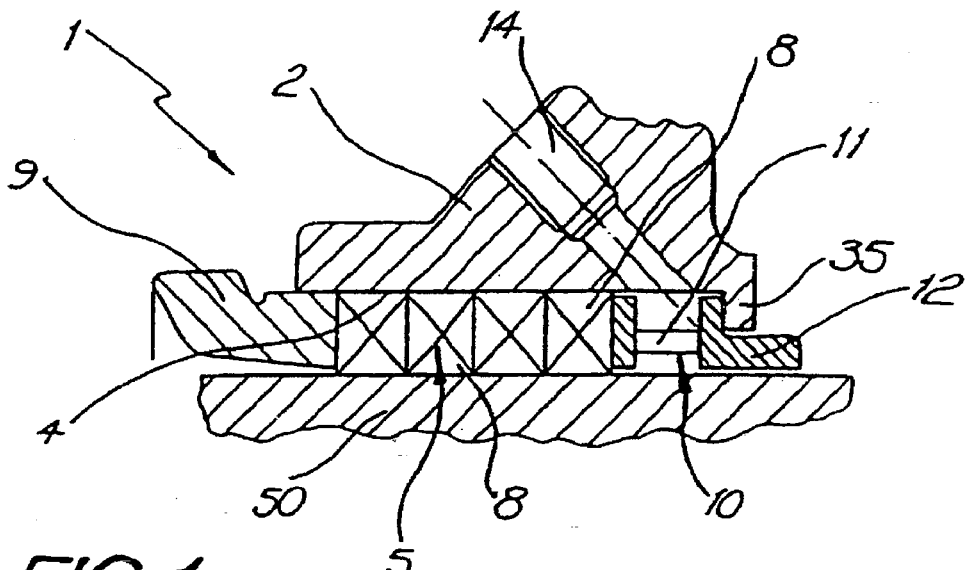
FIGS. 1–3 are schematic partial side cross-sectional views of gland seal assemblies according to the prior art.
Figure 2:
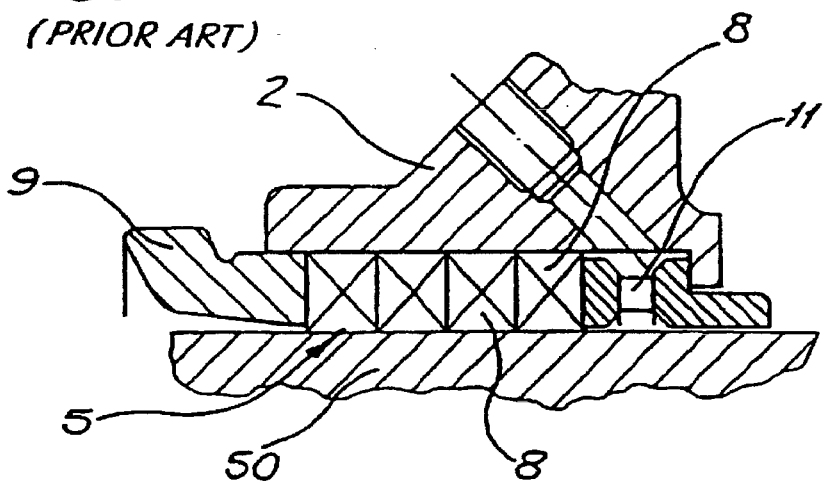
Figure 3:
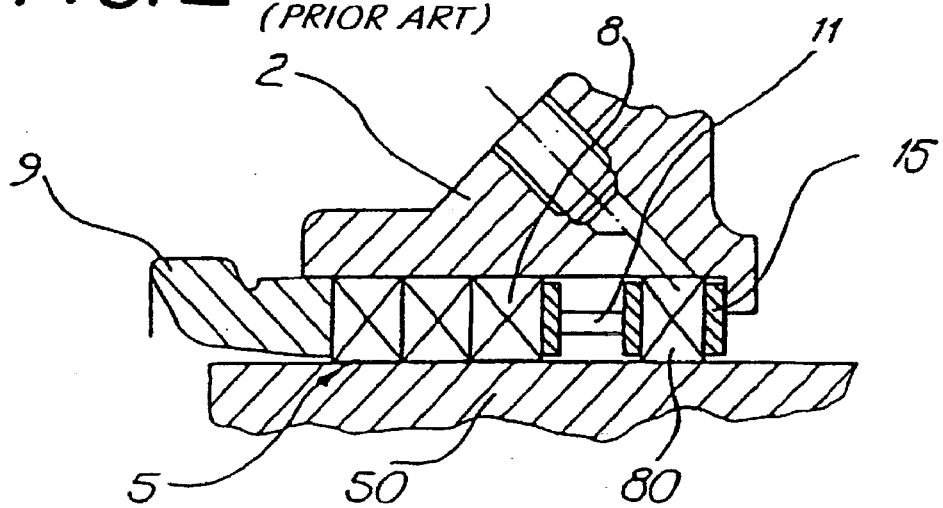
Figure 6:
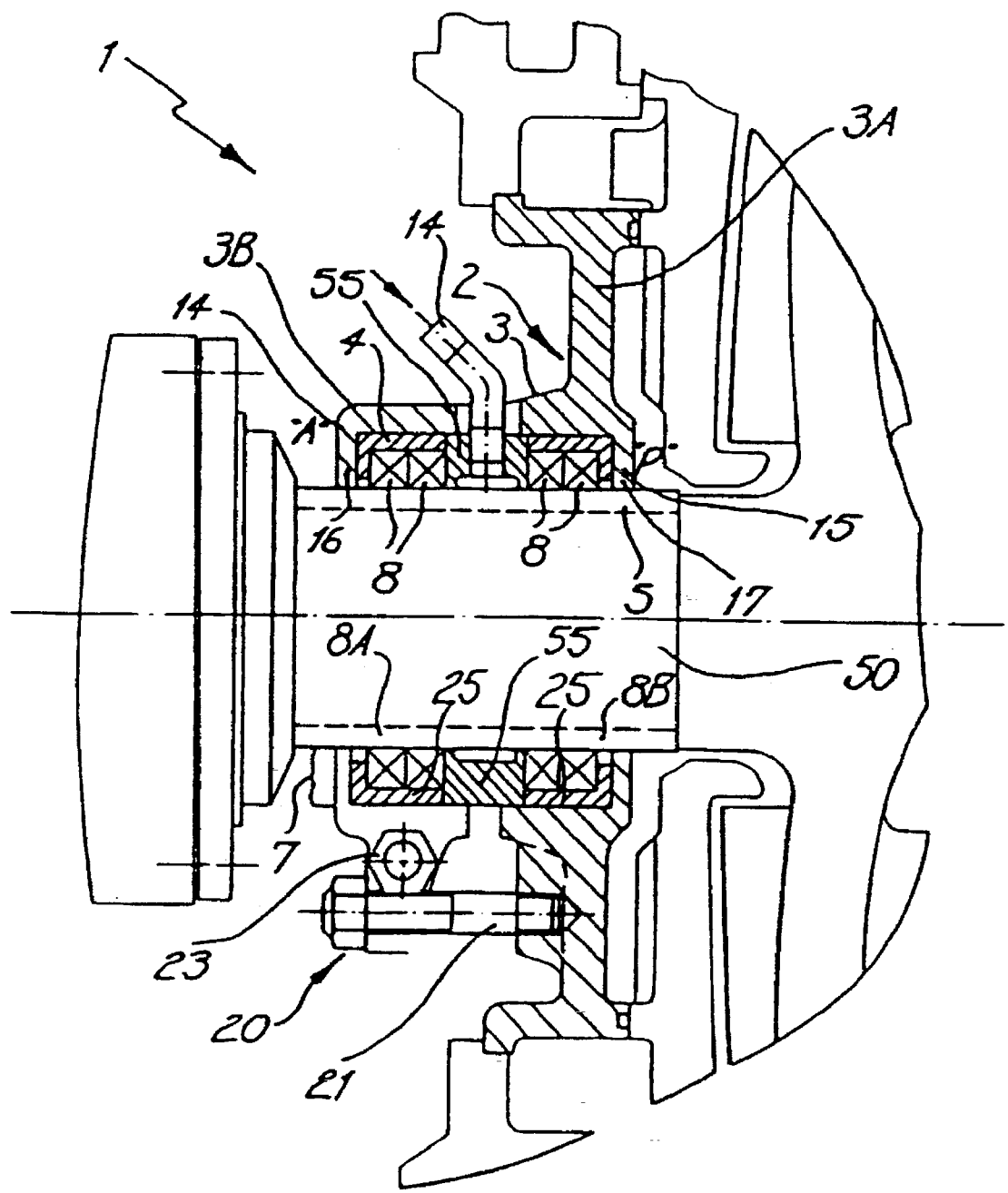
FIG. 6 is a similar view to FIG. 4 showing a modified form of packing assembly.

Referring to FIGS. 4, 5 and 6, it can be seen that the assembly of the present invention comprises certain features similar to conventional seal assemblies and where possible like reference numerals have been used to described like parts. The aim of any sealing assembly for a pump is in essence, to contain the pressurized pump fluid. Pressure is broken down by the sealing assembly so that pressure is at atmosphere outside the seal.

The sealing housing or stuffing box 2 has a bore 4 essentially parallel to the rotatable shaft 50 and forms an annular chamber 7. The housing 2 comprises a main body 3 comprising a first part 3A and a second part 3B. Abutment walls in the form of flanges 14 and 15 are provided, each having an inner edge 16 and 17. The inner diameter of the stuffing box comes into a diameter close to the shaft. The edges 16 and 17 are arranged so as to act as a restrictor gap to assist water flushing away slurry. The abutment walls 14 and 15 also forms a shoulder to support the packings 5. The housing or stuffing box would normally be metallic, although other suitable materials could be used. It may be possible to produce the part from a low wearing material such as High Chrome Iron as it is subject to wear by the slurry.

The shaft 50 would typically be protected by a hard metallic or coated sleeve to minimize wear.

The two parts 3A and 3B of the housing body 3 are arranged such that adjustment means in the form of bolts 21 permit the position of the two housing parts to be adjusted axially relative to one another and thus, varying the compression on the packings 5 and hence controlling the gap between the packings and sleeve or shaft and consequently the leakage in the seal assembly. The bolts 21 are carried on flanges 32 on housing parts 3B.

The arrangement is different to a conventional gland as the abutment walls do not enter the bore of the housing. Instead they form an annular seal chamber on the inside diameter. As shown housing part 3B is split into halves and fastened together by securing bolts 23. Part 3A may also be similarily split. During maintenance the housing parts can be split and removed from around the shaft 50 thus allowing easier access to the housing.

In the form of assembly shown a lantern ring 55 separates the two ends of the housing parts 3A and 3B. Its outer diameter locates into both the housing or stuffing box and the bore diameters to ensure and maintain concentricity. Typically, the lantern ring would be metallic but could have coatings or inserts on the inside diameter to minimise wear on the shaft or sleeve. A radial hole and annular groove on the inside diameter permits water to be injected into the critical packing/shaft or sleeve gap on both sides of the lantern ring. Thus, water can flow both into the pump and also to the outside.

Figure 7:
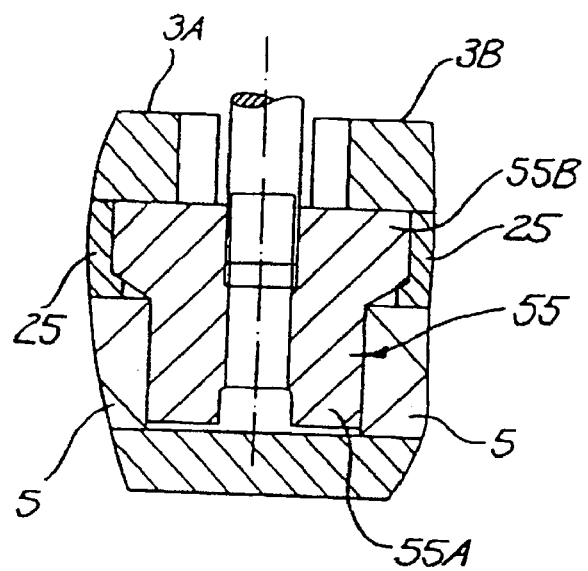
FIGS. 7 to 9 are various modified forms of lantern ring suitable for use in the assembly of the invention.
Figure 8:
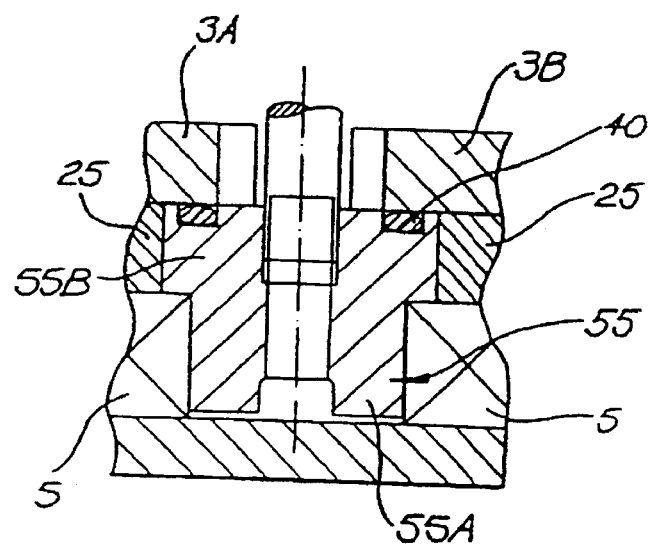
Figure 9:
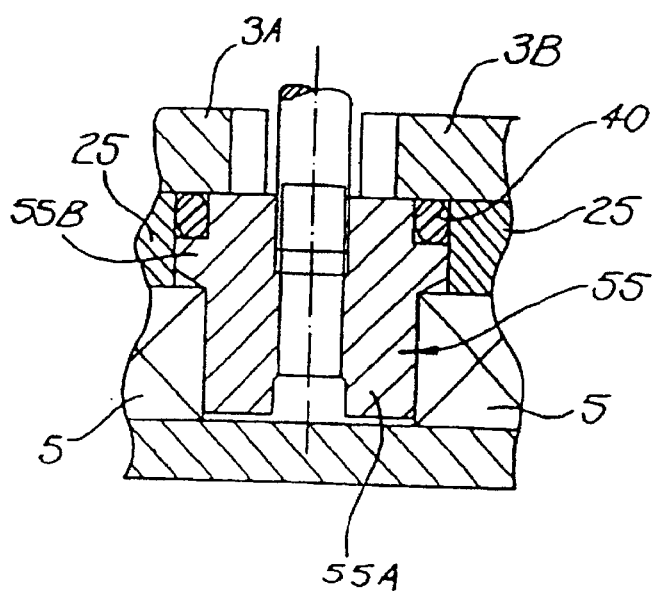

FIGS. 7 to 9 show various forms of lantern ring particularly suited for use with the gland seal assembly of the invention. In each case the lantern ring 55 comprises a first portion 55A which fits between the groups of packings 5 and an enlarged portion 55B which acts on the packing sleeves 25 to partially compress them.

The new arrangement could utilise any of the conventional packing types. These are normally a woven ring cut through in one location to allow installation around the shaft sleeve. The number of packings 8 can vary at either end. As shown two packings are provided at each end.

Packing sleeves 25 may be incorporated around the packings 5 at either end of the sealing assembly. Two packing sleeves 25 are shown each being associated with a respective group of packing rings 8A and 8B. These packing sleeves 25 have essentially elastomeric properties so that axial compression by relative movement between the two housing parts will at first squeeze these sleeves axially. The sleeves shown in FIG. 4.comprise an annular rim wall and those shown in FIG. 6 include a rim wall with a radially inwardly extending side wall at one end thereof. As the sleeves are essentially trapped between the outer housing 3 and the packings 5, the axial compression will be translated to a radial compression onto the packings. The packings will therefore be compressed axially and radially and the compression will be more uniform from ring to ring. More uniform compression on each packing ring will provide a far better control over the sealing assembly and operation and leakage. The packing sleeves will also assist sealing around the outside of the packing rings and stop uncontrolled leakage.

The arrangement as described above in accordance with the preferred embodiment, permits easier maintenance in that packing rings are more accessible for replacement and the length of the fixed side annular seal chamber is reduced and wear is more even.

Finally, it is to be understood that various alterations, modifications and/or additions may be incorporated into the various constructions and arrangements of parts without departing from the spirit or ambit of the invention.

I claim:

1. A gland seal assembly for a slurry pump, said gland seal assembly comprising:

a pump casing; and a housing having a main body including a bore therethrough for receiving a rotatable shaft, said main body being comprised of a fast part and a second part, one of said parts being secured to said pump casing, each of said first and second parts having a packing receiving zone defined by said bore, said packing receiving zones, in the assembled position, define an annular gap between an inner wall surface of said bore and an outer surface of said rotatable shaft, said first part and said second part being spaced apart from one another, each of said first and second parts further including a radially extending abutment flange, each abutment flange forming an end wall for the respective packing receiving zone, said abutment flanges being disposed remote from one another in the assembled position;

at least one packing ring being disposed within each of said packing receiving zones;

a lantern ring assembly disposed between said first part and said second part; and an adjustment means for causing relative movement between said abutment flanges in the axial direction of the bore.

2. The gland seal assembly according to claim 1, wherein each of said abutment flanges has a free inner edge which is disposed adjacent to said outer surface of said shaft in the assembled position.

3. The gland seal assembly according to claim 1, further comprising a neck ring disposed within each of said packing receiving zones, said neck ring being disposed between said respective end wall and said packing.

4. The gland seal assembly according to claim 1, wherein said adjustment means comprises a plurality of threaded bolts interconnecting said first part and said second part so that rotation of said bolts causes axial movement of said first and second parts, at least one of said first and second parts is comprised of two sections that are interconnected by bolts so that said two sections can be separated.

5. The gland seal assembly according to claim 1, further comprising a packing sleeve disposed within each packing receiving zone, said packing sleeve surrounding said respective at least one packing ring so that axial compression of the packing sleeve is translated, at least in part, to a radial compression of said respective at least one packing ring, said packing sleeve comprising an elastomeric ring disposed between said packing ring and said inner surface of said bore, said packing sleeve comprising an annular ring having an outer ring wall.

6. The gland seal assembly according to claim 5, wherein said packing sleeve includes a radially inwardly extending side wall disposed at one of the axial ends of said packing sleeve.

7. The gland seal assembly according to claim 5, wherein said at least one packing ring disposed in each packing receiving zone are spaced from one another by said lantern ring.

* * * * *